(12) United States Patent
Shin

(10) Patent No.: US 9,846,334 B2
(45) Date of Patent: Dec. 19, 2017

(54) LIQUID CRYSTAL DISPLAY DEVICE

(71) Applicant: SAMSUNG DISPLAY CO., LTD., Yongin-si (KR)

(72) Inventor: Donghee Shin, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/042,004

(22) Filed: Feb. 11, 2016

(65) Prior Publication Data

US 2016/0349571 A1     Dec. 1, 2016

(30) Foreign Application Priority Data

Jun. 1, 2015  (KR) ........................ 10-2015-0077272

(51) Int. Cl.
| | |
|---|---|
| *G02F 1/1339* | (2006.01) |
| *G02F 1/1335* | (2006.01) |
| *G02F 1/1337* | (2006.01) |
| *G02F 1/1333* | (2006.01) |
| *G02F 1/1362* | (2006.01) |

(52) U.S. Cl.
CPC .......... *G02F 1/1339* (2013.01); *G02F 1/1337* (2013.01); *G02F 1/133512* (2013.01); *G02F 2001/13398* (2013.01); *G02F 2001/133388* (2013.01); *G02F 2001/136222* (2013.01)

(58) Field of Classification Search
CPC ......... G02F 1/133514; G02F 1/133345; G02F 1/1339; G02F 1/133512
See application file for complete search history.

(56) References Cited

U.S. PATENT DOCUMENTS

| | | | |
|---|---|---|---|
| 7,339,647 B2* | 3/2008 | Youn ................. | G02F 1/1339 349/110 |
| 7,961,282 B2 | 6/2011 | Iwato et al. | |
| 8,174,663 B2 | 5/2012 | Lee et al. | |
| 2007/0139600 A1* | 6/2007 | Lee ................. | G02F 1/1339 349/153 |
| 2012/0099061 A1* | 4/2012 | Lee ................. | G02B 5/22 349/110 |
| 2012/0206669 A1* | 8/2012 | Kim ................. | G06F 1/1686 349/58 |
| 2012/0261065 A1* | 10/2012 | Lee ................. | G02F 1/133512 156/250 |
| 2014/0347612 A1 | 11/2014 | Park et al. | |

FOREIGN PATENT DOCUMENTS

| | | |
|---|---|---|
| KR | 1020080046348 | 5/2008 |
| KR | 100850398 | 7/2008 |
| KR | 101096687 | 12/2011 |

* cited by examiner

*Primary Examiner* — Donald Raleigh
(74) *Attorney, Agent, or Firm* — Cantor Colburn LLP

(57) ABSTRACT

A liquid crystal display ("LCD") device includes a first substrate and a second substrate each having a display area and a non-display area, a liquid crystal layer between the first substrate and the second substrate, a sealing portion in the non-display area, and a light shielding portion having a first aperture between the display area and the sealing portion.

20 Claims, 8 Drawing Sheets

LIQUID CRYSTAL DISPLAY DEVICE

This application claims priority to Korean Patent Application No. 10-2015-0077272, filed on Jun. 1, 2015, and all the benefits accruing therefrom under 35 U.S.C. §119, the content of which in its entirety is herein incorporated by reference.

BACKGROUND

1. Field

Exemplary embodiments of the invention relate to a liquid crystal display ("LCD") device, and more particularly, to an LCD device which prevents the permeation of an alignment solution into an outer circumference of a substrate.

2. Description of the Related Art

In the information-dependent modern society, the significance of display devices as a visual information transfer medium is recently widely acknowledged. Accordingly, various advantageous features may be important for display devices, such as low-power consumption, slimness, light-weight, and high-definition, need to be satisfied to continue to play an important role in the further development of the information technology.

Such display devices are classified into self-emission-type display devices in which display panels emit light, such as cathode ray tubes ("CRT"), electroluminescent ("EL") display devices, light emitting diode ("LED") display devices, vacuum fluorescent display ("VFD") devices, field emission display ("FED") devices, and plasma display panel ("PDP") devices, and non-emission-type display devices in which display panels do not emit light by themselves, such as liquid crystal display ("LCD") devices.

LCD devices display images using optical anisotropy of liquid crystals. In particular, LCD devices, along with PDP devices or FED devices, are recently garnering attention as a next-generation display device due to excellent visibility, relatively low average power consumption and a relatively small amount of dissipated heat, as compared to a like-sized CRT.

In general, an LCD device generally has a structure in which a lower substrate on which thin film transistors are arranged and an upper substrate on which color filters are formed are adhered to one another while having a liquid crystal layer therebetween. In this instance, since alignment layers are respectively provided on respective outermost surfaces of the lower substrate and the upper substrate, an initial alignment direction of liquid crystals is determined by the alignment layers.

The alignment layer is formed by coating a liquid-type alignment solution on a substrate and by performing a baking process.

SUMMARY

Due to permeability of an alignment solution, the alignment solution may infiltrate into an area for forming a sealing portion provided around an outer circumference of the substrate. In the case of the alignment solution infiltrating into the area for forming the sealing portion, the alignment layer may be in the area for forming the sealing portion subsequent to a baking process. Accordingly, a gap defect occurs corresponding to a height of the alignment layer in an overlapping area between the alignment layer and the sealing portion. In addition, the area for forming the sealing portion is contaminated by the alignment solution such that the adhesion of the alignment layer is diminished. Thus, the adhesion between the lower substrate and the upper substrate may be diminished.

Further, when the alignment solution is coated over the area for forming the sealing portion, an electric connection between a common line and a common electrode is obstructed, whereby a common voltage may not be transmitted to the common electrode.

Exemplary embodiments of embodiments of the invention are directed to a liquid crystal display ("LCD") device capable of preventing the contamination of an area for forming a sealing portion.

According to an exemplary embodiment of the invention, a liquid crystal display device includes a first substrate and a second substrate each having a display area and a non-display area, a liquid crystal layer between the first substrate and the second substrate, a sealing portion in the non-display area, and a light shielding portion having a first aperture between the display area and the sealing portion.

In an exemplary embodiment, the first aperture may have a closed curved line shape surrounding the display area.

In an exemplary embodiment, the liquid crystal display device may further include an aperture covering portion disposed corresponding to the first aperture.

In an exemplary embodiment, the aperture covering portion may have a closed curved line shape surrounding the display area.

In an exemplary embodiment, the aperture covering portion may include a plurality of covering patterns positioned in different layers, respectively.

At least two of the covering patterns may include different materials.

In an exemplary embodiment, the plurality of covering patterns may include first, second and third covering patterns, and the first covering pattern may include a same material as that included in a gate line of the first substrate.

In an exemplary embodiment, the first covering pattern and the gate line may be disposed on a same layer.

In an exemplary embodiment, the second covering pattern may include a same material as that included in a data line of the first substrate.

In an exemplary embodiment, the second covering pattern and the data line may be disposed on a same layer.

In an exemplary embodiment, the third covering pattern may include a same material as that included in a color filter on one of the first and second substrates.

In an exemplary embodiment, the third covering pattern and the color filter may be disposed on a same layer.

In an exemplary embodiment, the color filter may include color filters having different colors, and the third covering pattern may include a same material as that included in one of the color filters having different colors that has a lowest light transmittance.

In an exemplary embodiment, the color filter may include color filters having different colors, and the third covering pattern may include a same material as that included in one of the color filters having different colors that has a greatest thickness.

In an exemplary embodiment, the color filter may include color filters having different colors, and the third covering pattern may include at least two covering patterns including a same material as that included in at least two color filters.

In an exemplary embodiment, the at least two covering patterns may have a same thickness as that of one of the color filters.

In an exemplary embodiment, the liquid crystal display device may include an insulating interlayer between the light shielding portion and the first substrate, the insulating interlaying having an aperture corresponding to the first aperture.

In an exemplary embodiment, the light shielding portion may further have a second aperture in the display area.

In an exemplary embodiment, the liquid crystal display device may further include a common line between the first substrate and the sealing portion.

In an exemplary embodiment, the liquid crystal display device may further include a short-circuit portion connecting the common line and a common electrode of the second substrate.

The foregoing is illustrative only and is not intended to be in any way limiting. In addition to the illustrative exemplary embodiments, embodiments, and features described above, further exemplary embodiments, embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which:

FIG. 1 is a view illustrating an exemplary embodiment a lower panel of a liquid crystal display ("LCD") device and a peripheral circuit connected to the lower panel according to;

DETAILED DESCRIPTION

Figure 1:
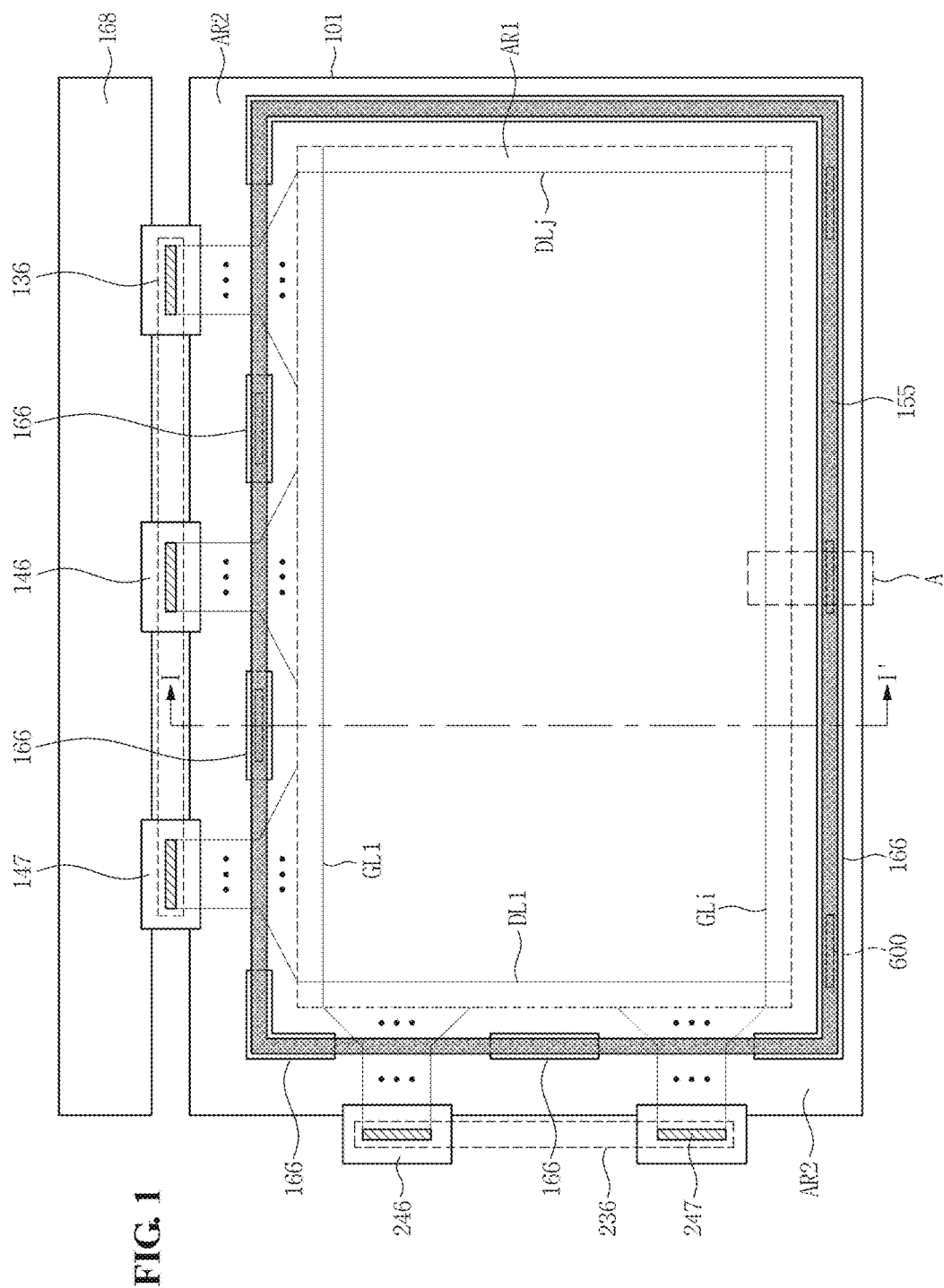

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Figure 2:
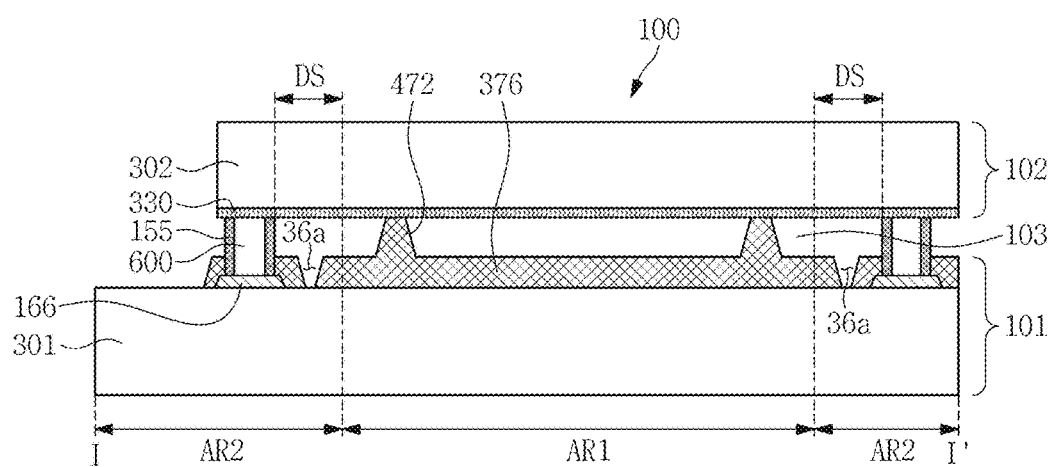
FIG. 2 is a cross-sectional view taken along line I-I' of FIG. 1.
Figure 3A:
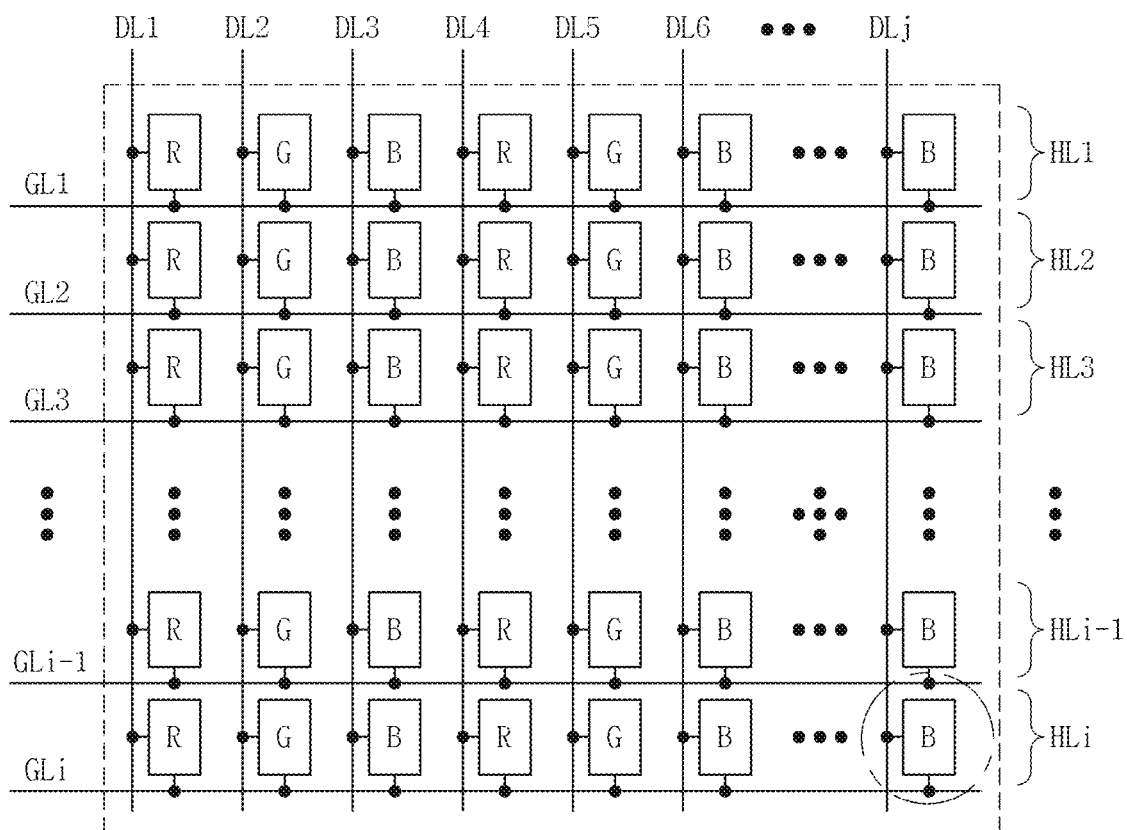
FIG. 3A is a view depicting pixels included in a display panel of FIG. 2.
Figure 3B:
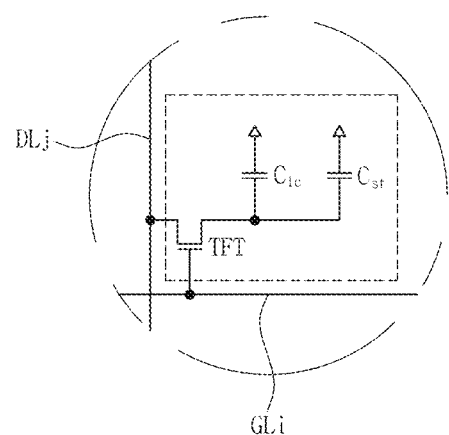
FIG. 3B is an enlarged view of a portion of the pixels of FIG. 3A.

FIG. 1 is a view illustrating a lower panel 101 of a liquid crystal display ("LCD") device and a peripheral circuit connected to the lower panel 101 according to an exemplary embodiment. FIG. 2 is a cross-sectional view taken along line I-I' of FIG. 1. FIG. 3A is a view depicting pixels included in a display panel 100 of FIG. 2, and FIG. 3B is an enlarged view of a portion of the pixels of FIG. 3A.

Referring to FIGS. 1 and 2, the LCD device according to the exemplary embodiment includes the display panel 100, a gate driver 236, and a data driver 136.

The display panel 100, as illustrated in FIG. 2, includes the lower panel 101, an upper panel 102, a liquid crystal layer 103, and a sealing portion 155. The display panel 100 is divided into a display area AR1 and a non-display area AR2.

The display area AR1 of the display panel 100 corresponds to a display area AR1 of the lower panel 101 and a display area AR1 of the upper panel 102. The non-display area AR2 of the display panel 100 corresponds to a non-display area AR2 of the lower panel 101 and a non-display area AR2 of the upper panel 102.

The sealing portion 155 is disposed between the lower panel 101 and the upper panel 102. In detail, the sealing portion 155, as illustrated in FIG. 2, is disposed between the non-display area AR2 of the lower panel 101 and the non-display area AR2 of the upper panel 102. In an exemplary embodiment, as illustrated in FIG. 1, the sealing potion 155 may have a closed curved line shape surrounding the display area AR1, for example.

The liquid crystal layer 103 is positioned in a space defined by the lower panel 101, the upper panel 102 and the sealing portion 155. In an exemplary embodiment, the liquid crystal layer 103 may have a negative dielectric anisotropy and may include vertically aligned liquid crystal molecules. In an alternative exemplary embodiment, the liquid crystal layer 103 may include a photopolymerization material, and such a photopolymerization material may include a reactive monomer or a reactive mesogen, for example.

As illustrated in FIG. 2, the lower panel 101 may have an area greater than an area of the upper panel 102 in size. The lower panel 101 and the upper panel 102 face each other while having the liquid crystal layer 103 therebetween.

Referring to FIGS. 1 and 2, the lower panel 101 includes a lower substrate 301, a plurality of gate lines GL1 to GLi, a plurality of data lines DL1 to DLj, and a common line 166. The gate lines GL1 to GLi, the data lines DL1 to DLj, and the common line 166 are disposed on the lower substrate 301.

The data lines DL1 to DLj intersect the gate lines GL1 to GLi. The gate lines GL1 to GLi extend onto the non-display area AR2 to be connected to the gate driver 236. The data lines DL1 to DLj extend onto the non-display area AR2 to be connected to the data driver 136.

The gate driver 236 includes a plurality of gate driving integrated circuits 247. The gate driving integrated circuits 247 generate gate signals and sequentially provide the gate signals to the first to i-th gate lines GL1 to GLi, respectively.

The gate driving integrated circuits 247 are mounted on gate carriers 246, respectively. The gate carriers 246 are electrically connected to the lower panel 101. In an exemplary embodiment, the gate carriers 246 are electrically connected between a circuit board 168 and a non-display area AR2 of the lower substrate 301, for example.

The data driver 136 includes a plurality of data driving integrated circuits 147. The data driving integrated circuits 147 receive digital image data signals and a data control signal from a timing controller. The data driving integrated circuits 147 perform sampling of the digital image data signals based on the data control signal, perform latching of the sampled digital image data signals corresponding to a single horizontal line for each horizontal period, and provide the latched digital image data signals to the data lines DL1 to DLj, respectively. In other words, the data driving integrated circuits 147 convert the digital image data signals provided from the timing controller into analog image data signals using gamma reference voltages that are input from a power supply (not illustrated), and provide the analog image data signals to the data lines DL1 to DLj, respectively.

The data driving integrated circuits 147 are mounted on data carriers 146, respectively. The data carriers 146 are connected between the circuit board 168 and the lower panel 101. In an exemplary embodiment, the data carriers 146 are electrically connected between the circuit board 168 and the non-display area AR2 of the lower substrate 301, for example.

As the aforementioned timing controller and the power supply may be disposed on the circuit board 168, the data carrier 146 includes input wirings for transmitting various signals from the timing controller and the power supply to a predetermined data driving integrated circuit 147 and output wirings for transmitting image data signals output from the data driving integrated circuit 147 to corresponding data lines. At least one of the data carriers 146 may further include auxiliary wirings for transmitting various signals from the timing controller and the power supply to the gate driver 236. The auxiliary wirings are connected to panel wirings on the lower panel 101. The panel wirings connect the auxiliary wirings and the gate driver 236 to one another. In an exemplary embodiment, the panel wirings may be provided in the non-display area AR2 of the lower substrate 301 in a line-on-glass manner.

The common line 166 is disposed between the sealing portion 155 and the lower substrate 301. The common line 166 is disposed along the sealing portion 155. However, as illustrated in FIG. 1, the common line 166 is absent at an intersection area between the sealing portion 155 and the gate lines GL1 to GLi. In addition, as illustrated in FIG. 1, the common line 166 is absent at an intersection area between the sealing portion 155 and the data lines DL1 to DLj.

The common line 166 receives a common voltage from the aforementioned power supply. To this end, the common line 166 may be connected to the power supply via a line on the gate carrier 246 and a line on the data carrier 146.

The upper panel 102 includes an upper substrate 302 and a common electrode 330 on the upper substrate 302.

The common electrode 330 of the upper panel 102 is connected to the common line 166 of the lower panel 101 via the short-circuit portion 600. The common electrode 330 receives a common voltage from the common line 166 via the short-circuit portion 600.

The display panel 100, as illustrated in FIG. 3A, includes a plurality of pixels R, G, and B. The pixels R, G, and B, as illustrated in FIG. 3A, are disposed in the display area AR1 of the display panel 100.

The pixels R, G, and B are arranged in a matrix form. The pixels R, G, and B are categorized into red pixels R displaying a red image, green pixels G displaying a green image, and blue pixels B displaying a blue image. In an exemplary embodiment, horizontally adjacent red, green, and blue pixels R, G, and B may define a unit pixel for displaying a unit image. However, the invention is not limited thereto, and various other colors may define the unit pixel.

There are j pixels (j being a natural number) arranged along an n-th horizontal line (n being one of 1 to i), and the j pixels are also referred to as "n-th horizontal line pixels" and may be respectively connected to the first to j-th data lines DL1 to DLj, respectively. In addition, the n-th horizontal line pixels are connected to an n-th gate line. Accordingly, the n-th horizontal line pixels receive an n-th gate signal. In other words, all the j pixels arranged along the same horizontal line receive the same gate signal while other pixels disposed on different horizontal lines receive different gate signals from one another. In an exemplary embodiment, a red pixel R, a green pixel G and a blue pixel B disposed on a first horizontal line HL1 all receive a first gate signal while a red pixel R, a green pixel G and a blue pixel B disposed on a second horizontal line HL2 all receive a second gate signal having a different timing from that of the first gate signal, for example.

As illustrated in FIG. 3A, each of the red, green, and blue pixels R, G, and B includes a thin film transistor TFT, a liquid crystal capacitor Clc, and a storage capacitor Cst.

Referring to the enlarged portion in FIG. 3B, the thin film transistor TFT is turned on based on a gate signal from the gate line GLi. The turned-on thin film transistor TFT provides an analog image data signal provided from the data line DLj to the liquid crystal capacitor Clc and the storage capacitor Cst.

The liquid crystal capacitor Clc includes a pixel electrode PE (refer to FIG. 5) and the common electrode 330 disposed to oppose one another.

The storage capacitor Cst includes a pixel electrode PE and an opposing electrode disposed to oppose one another. In an exemplary embodiment, the opposing electrode may be a previous gate line GLi-1 or a transmission line (not illustrated) transmitting a common voltage.

The lower panel 101, as illustrated in FIG. 2, further includes a light shielding portion 376. A description on the light shielding portion 376 will be provided hereinbelow with reference to FIGS. 2 and 4.

Figure 4:
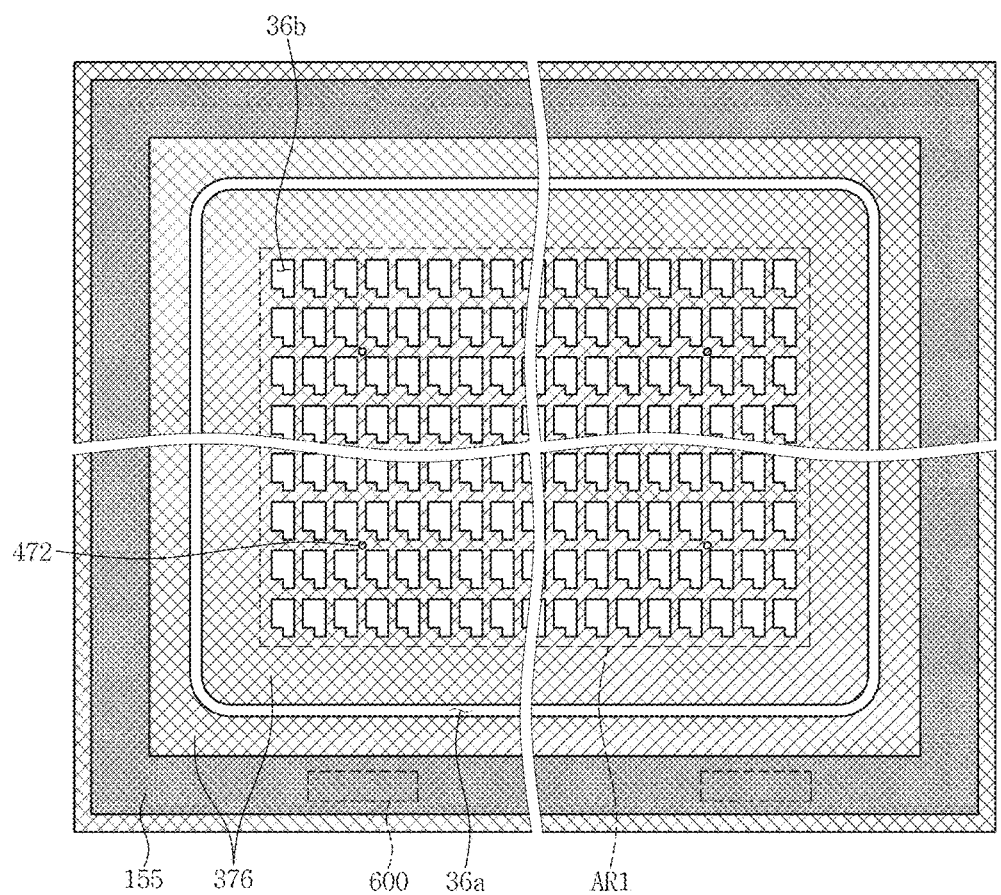
FIG. 4 is a plan view illustrating a light shielding portion and a sealing portion of FIG. 2.

FIG. 4 is a plan view illustrating the light shielding portion 376 and the sealing portion 155 of FIG. 2.

The light shielding portion 376, as illustrated in FIG. 2, is disposed on the lower substrate 301. A portion of the light shielding portion 376 is surrounded by the sealing portion 155. The light shielding portion 376, as illustrated in FIG. 4, has a first aperture 36a and a second aperture 36b. In other words, A first aperture 36a and a second aperture 36b are defined in the light shielding portion 376.

The first aperture 36a of the light shielding portion 376 serves to prevent the permeation of an alignment solution into an edge of the lower panel 101. To this end, the first aperture 36a is disposed in the non-display area AR2. In an exemplary embodiment, the first aperture 36a may be provided in a portion of the non-display area AR2 between the sealing portion 155 and the display area AR1, for example. The portion of the non-display area AR2 between the sealing portion 155 and the display area AR1 is also referred to as a dead space DS, and the first aperture 36a may be provided in the dead space DS.

The first aperture 36a, as illustrated in FIG. 4, may have a closed curved line shape surrounding the display area AR1. In an alternative exemplary embodiment, the first aperture 36a may have a discontinuous curved line shape having at least a disconnected portion.

At least two first apertures 36a may be provided between the sealing portion 155 and the display area AR1. In an exemplary embodiment, in a case of having two first apertures 36a, one of the first apertures 36a may be provided between the sealing portion 155 and the display area AR1, and the other first aperture 36a may be provided between the one first aperture 36a and the sealing portion 155, for example. In this case, as previously described, the two first apertures 36a may have a closed curved line shape or a discontinuous curved line shape.

The second aperture 36b of the light shielding portion 376 is configured to define a pixel area. In other words, the second aperture 36b is positioned corresponding to the pixel electrode PE of each pixel. The light shielding portion 376 blocks light in an area aside from the second apertures 36b. In an exemplary embodiment, the light shielding portion 376 is disposed on the thin film transistor TFT, the gate lines GL1 to GLi, and the data lines DL1 to DLj to thereby prevent light that has been transmitted through the thin film transistor TFT, the gate lines GL1 to GLi, and the data lines DL1 to DLj from being emitted externally, for example.

A column spacer 472 may be disposed on the light shielding portion 376. The column spacer 472 may have a shape protruding toward the upper panel 102 to have a predetermined height. The column spacer 472 maintains a uniform cell gap between the lower panel 101 and the upper panel 102. The column spacer 472 may be integrally provided with the light shielding portion 376. In this case, the column spacer 472 and the light shielding portion 376 may be simultaneously provided, and include the same material.

The light shielding portion 376 may be disposed on the upper substrate 302 rather than on the lower substrate 301.

A detailed description on the structure of the lower panel 101 will be provided hereinbelow with reference to FIGS. 5 and 6.

Figure 5:
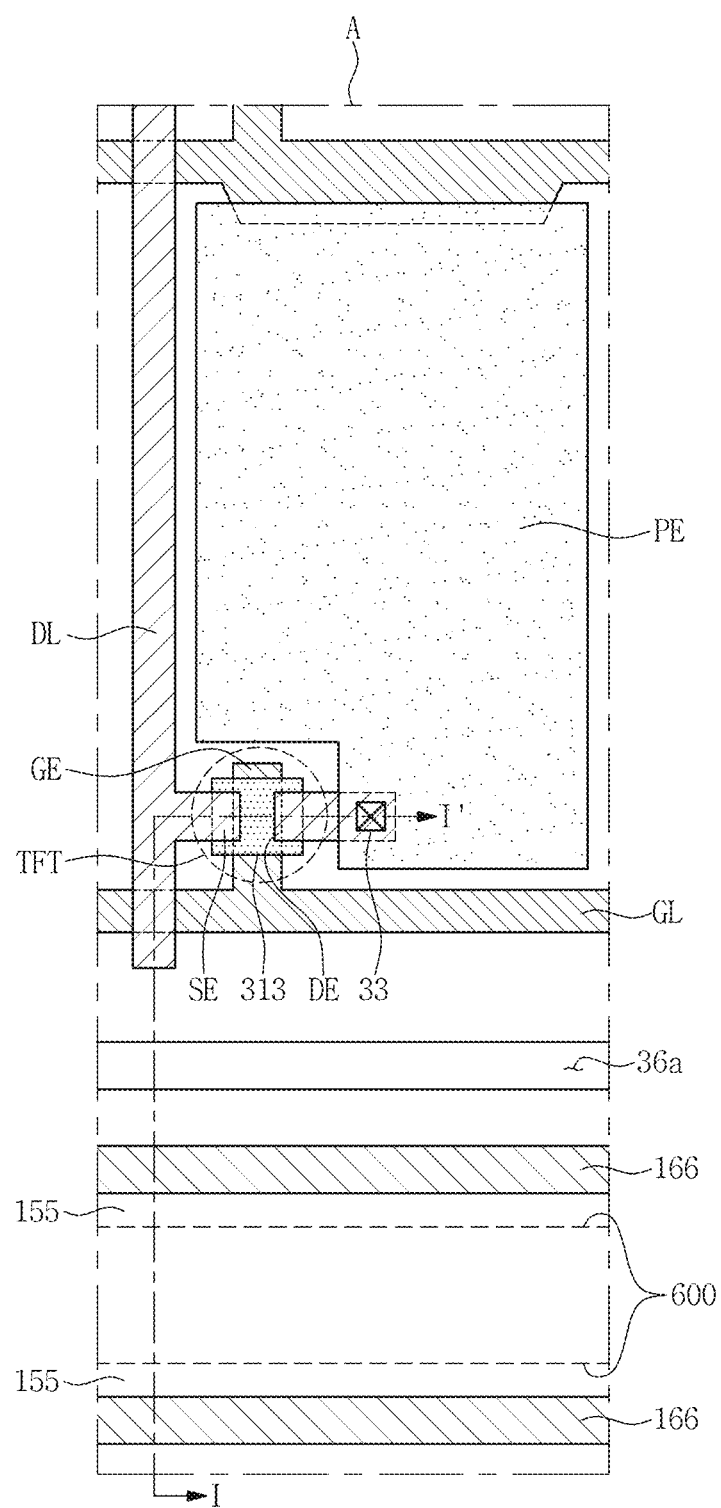
FIG. 5 is an enlarged view illustrating portion "A" of FIG. 1.

FIG. 5 is an enlarged view illustrating portion "A" of FIG. 1. FIG. 6 is a cross-sectional view taken along line I-I' of FIG. 5.

Figure 6:
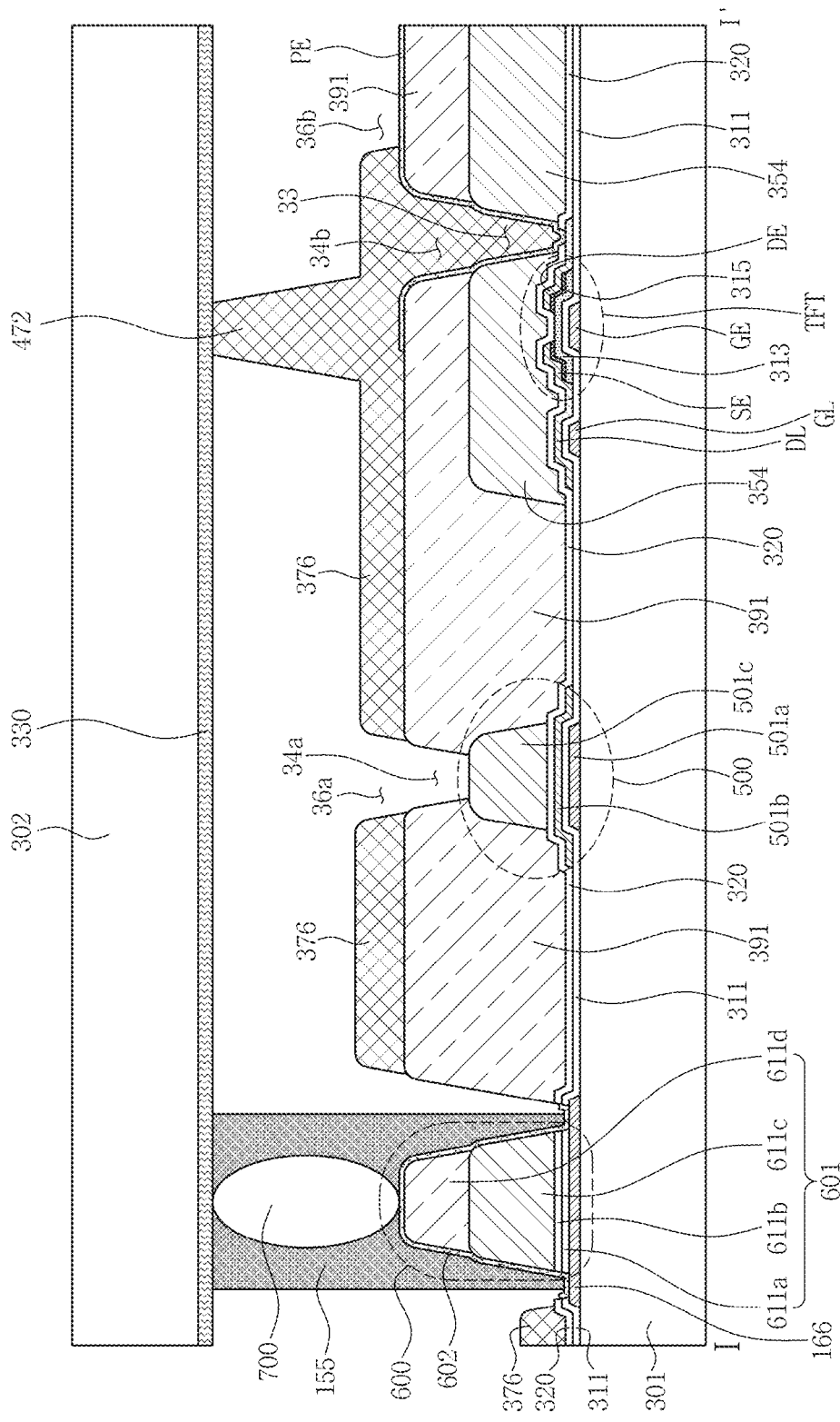
FIG. 6 is a cross-sectional view taken along line I-I' of FIG. 5.

Referring to FIGS. 1, 5 and 6, the lower panel 101 includes the lower substrate 301, the gate line GL, the data line DL, the common line 166, the thin film transistor TFT, a gate insulating layer 311, a passivation layer 320, a color filter 354, an insulating interlayer 391, the pixel electrode PE, the light shielding portion 376, an aperture covering portion 500, and the short-circuit portion 600.

The thin film transistor TFT includes a gate electrode GE, a semiconductor layer 313, an ohmic contact layer 315, a source electrode SE, and a drain electrode DE.

The gate line GL, the gate electrode GE, and the common line 166 are disposed on the lower substrate 301. The gate line GL may have a connection portion, for example, an end portion thereof, which is greater than another portion thereof in size, to be connected to another layer or an external driving circuit. In an exemplary embodiment, at least one of the gate line GL, the gate electrode GE, and the common line 166 may include at least one of an aluminum (Al) based metal such as Al or an Al alloy, a silver (Ag) based metal such as Ag or an Ag alloy, a copper (Cu) based metal such as Cu or an Cu alloy, and a molybdenum (Mo) based metal such as Mo or a Mo alloy. In an alternative exemplary embodiment, at least one of the gate line GL, the gate electrode GE, and the common line 166 may include at least one of chromium (Cr), tantalum (Ta), and titanium (Ti), for example. In an exemplary embodiment, at least one of the gate line GL, the gate electrode GE, and the common line 166 may have a multilayer structure including at least two conductive layers having different physical properties.

The gate insulating layer 311 is disposed on the gate line GL, the gate electrode GE, and the common line 166. In an exemplary embodiment, the gate insulating layer 311 may be disposed over an entire surface of the lower substrate 301 which includes the gate line GL, the gate electrode GE and the common line 166. In an exemplary embodiment, a common contact hole through which the common line 166 is exposed may be defined in the gate insulating layer 311. In an exemplary embodiment, the gate insulating layer 311 may include silicon nitride ($SiN_x$), silicon oxide ($SiO_x$), or the like, for example. In an exemplary embodiment, the gate insulating layer 311 may have a multilayer structure including at least two insulating layers having different physical properties, for example.

The semiconductor layer 313 is disposed on the gate insulating layer 311. In an exemplary embodiment, the semiconductor layer 313 overlaps the gate electrode GE. In an exemplary embodiment, the semiconductor layer 313 may include amorphous silicon, polycrystalline silicon, or the like, for example.

The ohmic contact layer 315 is disposed on the semiconductor layer 313. In an exemplary embodiment, the ohmic contact layer 315 may include silicide or n+ hydrogenated amorphous silicon doped with high concentration n-type impurities such as phosphorus. In an exemplary embodiment, the ohmic contact layer 315 may be disposed on the semiconductor layer 313 in pairs.

The source electrode SE may be disposed on an ohmic contact layer 315 contacting one portion of the semiconductor layer 313. The source electrode SE extends from the data line DL. In an exemplary embodiment, as illustrated in FIG. 5, the source electrode SE has a shape protruding from the data line DL toward the gate electrode GE, for example. The source electrode SE overlaps the semiconductor layer 313 and the gate electrode GE. In an exemplary embodiment, the source electrode SE may include, in particular, a refractory metal such as chromium (Cr), tantalum (Ta) and titanium (Ti) or an alloy thereof. In an exemplary embodiment, the source electrode SE may have a multilayer structure including a refractory metal layer and a low-resistance conductive layer. Examples of the multilayer structure may include a double-layer structure including a Cr or Mo (Mo alloy) lower layer and an Al (Al alloy) upper layer, and a triple-layer structure including a Mo (Mo alloy) lower layer, an Al (Al alloy) intermediate layer, and a Mo (Mo alloy) upper layer. Further, the source electrode SE may include various metals or conductive materials, in addition to, or instead of, the aforementioned materials.

The drain electrode DE is disposed on an ohmic contact layer 315 contacting the other portion of the semiconductor layer 313. The drain electrode DE overlaps the gate electrode GE and the semiconductor layer 313. The drain electrode DE is connected to the pixel electrode PE. The drain electrode DE may include the same material and may have the same structure (multilayer structure) as those of the aforementioned source electrode SE. In other words, the drain electrode DE and the source electrode SE may be simultaneously provided in the same process.

The gate electrode GE, the source electrode SE, the drain electrode DE, the semiconductor layer 313, and the ohmic contact layer 315 together constitute the thin film transistor TFT. In an exemplary embodiment, a channel of the thin film transistor TFT is disposed on a portion of the semiconductor layer 313 between the source electrode SE and the drain electrode DE. The portion of the semiconductor layer 313 corresponding to the channel has a thickness less than that of another portion of the semiconductor layer 313.

The data line DL is disposed on the gate insulating layer 311. Although not illustrated, the data line DL may have a connection portion, for example, an end portion thereof, which is greater than another portion thereof in size, to be connected to another layer or an external driving circuit. The data line DL intersects the gate line GL. Although not illustrated, in an exemplary embodiment, the data line DL may have a narrower line width at a portion thereof intersecting the gate line GL than a line width of another portion thereof. Accordingly, a parasitic capacitance between the data line DL and the gate line GL may decrease. The data line DL may include the same material and may have the same structure (multilayer structure) as those of the aforementioned source electrode SE. In other words, the data line DL and the source electrode SE may be simultaneously provided in the same process.

The passivation layer 320 is disposed on the data line DL, the source electrode SE, the drain electrode DE, and the gate insulating layer 311. In an exemplary embodiment, the passivation layer 320 may be disposed over an entire surface of the lower substrate 301 which includes the data line DL, the source electrode SE, the drain electrode DE, and the gate insulating layer 311. A drain contact hole through which the drain electrode DE is exposed and a common contact hole through which the common line 166 is exposed may be defined in the passivation layer 320. In an exemplary embodiment, the passivation layer 320 may include an inorganic insulating material such as $SiN_x$ or $SiO_x$. In an exemplary embodiment, the inorganic insulating material may have photosensitivity and a dielectric constant of about 4.0. In an exemplary embodiment, the passivation layer 320 may also have a double-layer structure including a lower inorganic layer and an upper organic layer. The double-layer structure of the passivation layer 320 may have an excellent insulating property, and damage to an exposed portion of the semiconductor layer 313 may be significantly reduced. In an exemplary embodiment, the passivation layer 320 may have a thickness of greater than or equal to about 5000 angstroms (Å), and more particularly, in a range of about 6000 Å to about 8000 Å, for example.

The color filter 354 is disposed on the passivation layer 320. As the color filter 354 is disposed corresponding to the second aperture 36b of the light shielding portion 376, an edge of the color filter 354 is disposed on the gate line GL, the thin film transistor TFT, and the data line DL. The aperture 33 of the color filter 354 is positioned corresponding to the drain contact hole. In an exemplary embodiment, the edge of the color filter 354 may overlap an edge of an adjacent color filter 354. In an exemplary embodiment, the color filter 354 may include a photosensitive organic material, for example.

As the insulating interlayer 391 includes a first aperture 34a and a second aperture 34b, the insulating interlayer 391 is disposed on the color filter 354 and the passivation layer 320. In an exemplary embodiment, the insulating interlayer 391 may be disposed over an entire surface of the lower substrate 301 which includes the color filter 354 and the passivation layer 320. The first aperture 34a of the insulating interlayer 391 is positioned corresponding to the first aperture 36a of the light shielding portion 376, and the second aperture 34b of the insulating interlayer 391 is positioned corresponding to the drain contact hole. The first aperture 34a of the insulating interlayer 391 may have the same shape as that of the first aperture 36a of the light shielding portion 376. In an exemplary embodiment, the first aperture 34a of the insulating interlayer 391 may have a closed curved line shape. In an exemplary embodiment, the insulating interlayer 391 may include an organic material, for example.

The pixel electrode PE is connected to the drain electrode DE through the drain contact hole, the aperture 33 and the second aperture 34b. The pixel electrode PE is disposed on the insulating interlayer 391. As the pixel electrode PE is disposed corresponding to the second aperture 36b of the light shielding portion 376, a portion of the pixel electrode PE may overlap a body of the light shielding portion 376 that is configured to define the second aperture 36b. In an exemplary embodiment, the pixel electrode PE may include a transparent conductive material such as indium-tin oxide ("ITO") or indium-zinc oxide ("IZO"). In an exemplary embodiment, ITO may be a polycrystalline or monocrystalline material, and IZO may be a polycrystalline or monocrystalline material, for example.

The light shielding portion 376 is disposed on the pixel electrode PE and the insulating interlayer 391. As previously described, the first aperture 36a and the second aperture 36b are defined in the light shielding portion 376.

The aperture covering portion 500 serves to prevent light from being emitted externally through the first aperture 36a of the light shielding portion 376. In other words, as a backlight unit providing light to the display panel 100 may be provided on a lower surface of the lower substrate 301, the aperture covering portion 500 prevents light from the backlight unit from being transmitted through the first aperture 36a. To this end, the aperture covering portion 500 is disposed corresponding to the first aperture 36a. The aperture covering portion 500 may have the same shape as that of the first aperture 36a of the light shielding portion 376. In an exemplary embodiment, the aperture covering portion 500 may have a closed curved line shape, for example.

The aperture covering portion 500 may include a plurality of covering patterns positioned in different layers, respectively. In an exemplary embodiment, the aperture covering portion 500, as illustrated in FIG. 6, may include vertically stacked first, second, and third covering patterns 501a, 501b, and 501c, for example. In an exemplary embodiment, all of the first, second, and third covering patterns 501a, 501b, and 501c are disposed corresponding to the first aperture 36a of the light shielding portion 376. Each of the first, second, and third covering patterns 501a, 501b, and 501c may have the same shape as that of the first aperture 36a of the light shielding portion 376. In an exemplary embodiment, each of the first, second, and third covering patterns 501a, 501b, and 501c may have a closed curved line shape, for example.

The plurality of covering patterns included in the aperture covering portion 500 may include different materials. In an exemplary embodiment, the first, second, and third covering patterns 501a, 501b, and 501c may be provided using different materials, for example.

The first covering pattern 501a is disposed on the lower substrate 301. The first covering pattern 501a may be disposed on the same layer as a layer on which the gate line GL or the gate electrode GE is disposed. The first covering pattern 501a and the gate line GL may be simultaneously provided, and include the same material.

The second covering pattern 501b is disposed on the first covering pattern 501a. The second covering pattern 501b may be disposed on the same layer as a layer on which the data line DL or the source electrode SE is disposed. The second covering pattern 501b and the data line DL may be simultaneously provided, and include the same material. The gate insulating layer 311 is disposed between the first covering pattern 501a and the second covering pattern 501b.

The third covering pattern 501c is disposed on the second covering pattern 501b. The third covering pattern 501c may be disposed on the same layer as a layer on which the color filter 354 is disposed. The third covering pattern 501c and the color filter 354 may be simultaneously provided, and include the same material. In an exemplary embodiment, the color filter 354 may include a red color filter, a green color filter, and a blue color filter, for example. Accordingly, the third covering pattern 501c may include the same material as that included in one of the red color filter, the green color filter, and the blue color filter. In an exemplary embodiment, the third covering pattern 501c may include the same material as that included in one of the red, green, and blue color filters that has the lowest light transmittance. In an exemplary embodiment, the third covering pattern 501c may include the same material as that included in the blue color filter, for example. As the red color filter, the green color filter, and the blue color filter may have different thicknesses, the third covering pattern 501c may include the same material as that included in one of the red, green, and blue color filters that has the greatest thickness. In an exemplary embodiment, the third covering pattern 501c may include the same material as that included in the blue color filter, for example. The passivation layer 320 is disposed between the second covering pattern 501b and the third covering pattern 501c. In an exemplary embodiment, the aperture covering portion 500 may include one or two of the first, second, and third covering patterns 501a, 501b, and 501c.

The short-circuit portion 600 includes a protrusion 601 and a connection electrode 602. The protrusion 601 is disposed on the common line 166, and the connection electrode 602 is disposed on the common line 166 and the protrusion 601.

The protrusion 601 may include a plurality of protrusion patterns positioned in different layers, respectively. In an exemplary embodiment, the protrusion 601, as illustrated in FIG. 6, may include vertically stacked first, second, third, and fourth protrusion patterns 611a, 611b, 611c, and 611d, for example.

The plurality of protrusion patterns included in the protrusion 601 may include different materials from one another. In an exemplary embodiment, the first, second, third, and fourth protrusion patterns 611a, 611b, 611c, and 611d may include different materials from one another, for example.

The first protrusion pattern 611a may be disposed on the same layer as a layer on which the gate insulating layer 311 is disposed. The first protrusion pattern 611a and the gate insulating layer 311 may be simultaneously provided, and include the same material.

The second protrusion pattern 611b may be disposed on the same layer as a layer on which the passivation layer 320 is disposed. The second protrusion pattern 611b and the passivation layer 320 may be simultaneously provided, and include the same material.

The third protrusion pattern 611c may be disposed on the same layer as a layer on which the color filter 354 is disposed. The third protrusion pattern 611c and the color filter 354 may be simultaneously provided, and include the same material. In an exemplary embodiment, the third protrusion pattern 611c may include the same material as that included in one of the red color filter, the green color filter, and the blue color filter. In particular, the third protrusion pattern 611c may include the same material as that included in one of the red, green, and blue color filters that has the lowest light transmittance. In an exemplary embodiment, the third protrusion pattern 611c may include the same material as that included in the blue color filter, for example. The third protrusion pattern 611c may include the same material as that included in one of the red, green, and blue color filters that has the greatest thickness. In an exemplary embodiment, in a case in which the blue color filter has the greatest thickness, the third protrusion pattern 611c may include the same material as that included in the blue color filter, for example.

The fourth protrusion pattern 611d may be disposed on the same layer as a layer on which the insulating interlayer 391 is disposed. The fourth protrusion pattern 611d and the insulating interlayer 391 may be simultaneously provided, and include the same material. The protrusion 601 may include the first, second, and third protrusion patterns 611a, 611b, and 611c, absent the fourth protrusion pattern 611d.

The connection electrode 602 is disposed on the common line 166 and the fourth protrusion pattern 611d. In an exemplary embodiment, the connection electrode 602 is connected to the common line 166 through a contact hole that penetrates through the gate insulating layer 311 and the passivation layer 320. The connection electrode 602 is connected to the common electrode 330 via a conductive ball 700 which is included in the sealing portion 155.

Figure 7:
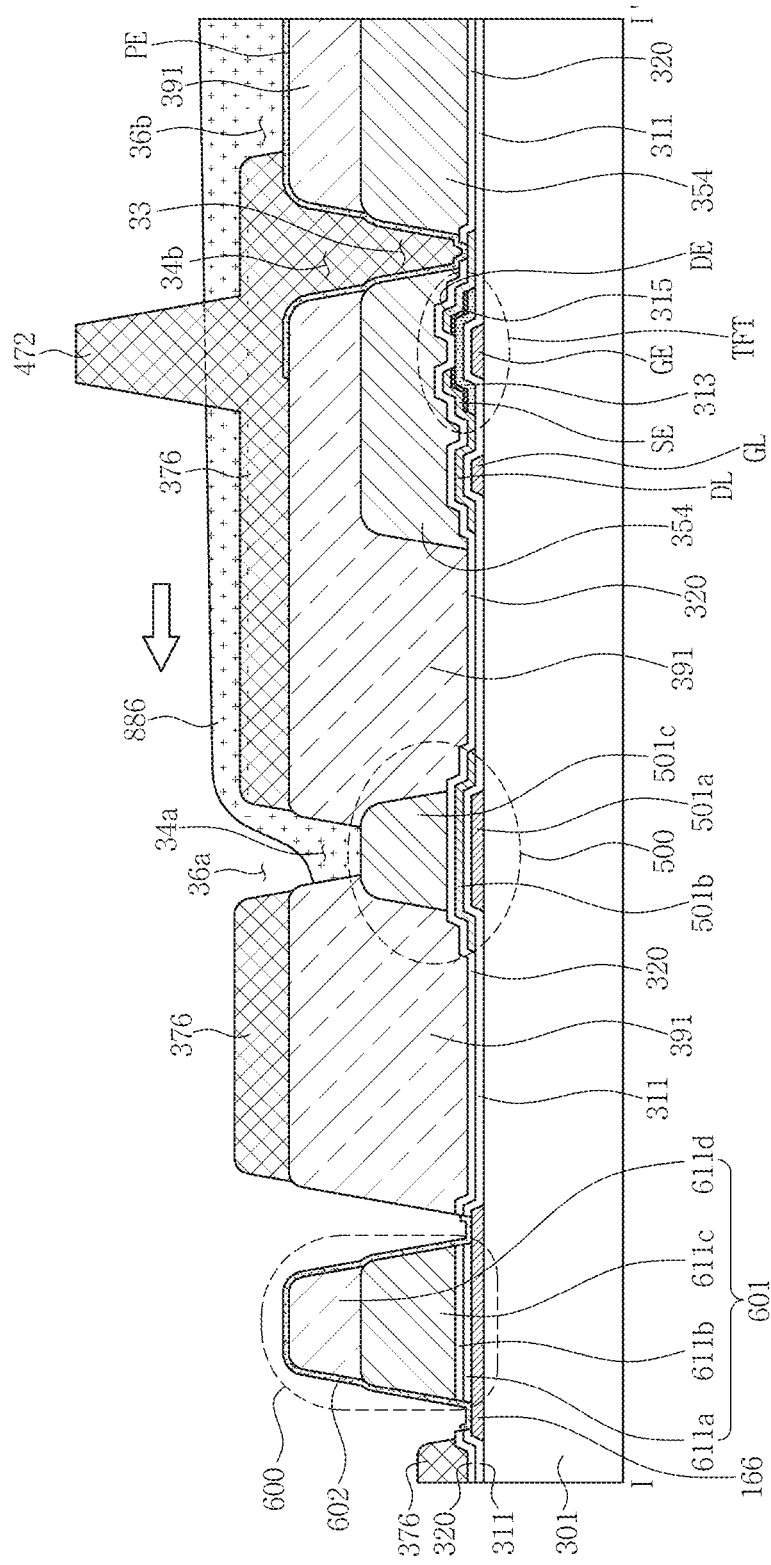
FIG. 7 is a view illustrating an example in which the flow of an alignment solution is obstructed by a first aperture of a light shielding portion.

FIG. 7 is a view illustrating an example in which the flow of an alignment solution 886 is obstructed by the first aperture 36a of the light shielding portion 376.

A flow direction of the alignment solution 886 is indicated by the arrow in FIG. 7. As illustrated in FIG. 7, the flow of the alignment solution 886 is obstructed by the first aperture 36a. In other words, the alignment solution 886 may not infiltrate into an area to be provided with the sealing portion 155 (hereinafter, also referred to as a "sealing portion forming area"), due to being obstructed by the first aperture 36a. Accordingly, the alignment solution 886 is confined in the first aperture 36a which has a closed curved line shape. Thus, the contamination of the sealing portion forming area due to the alignment solution 886 may be prevented.

The aperture covering portion 500 may include color filters having different colors. A description pertaining thereto will be provided in greater detail hereinbelow with reference to FIG. 8.

Figure 8:
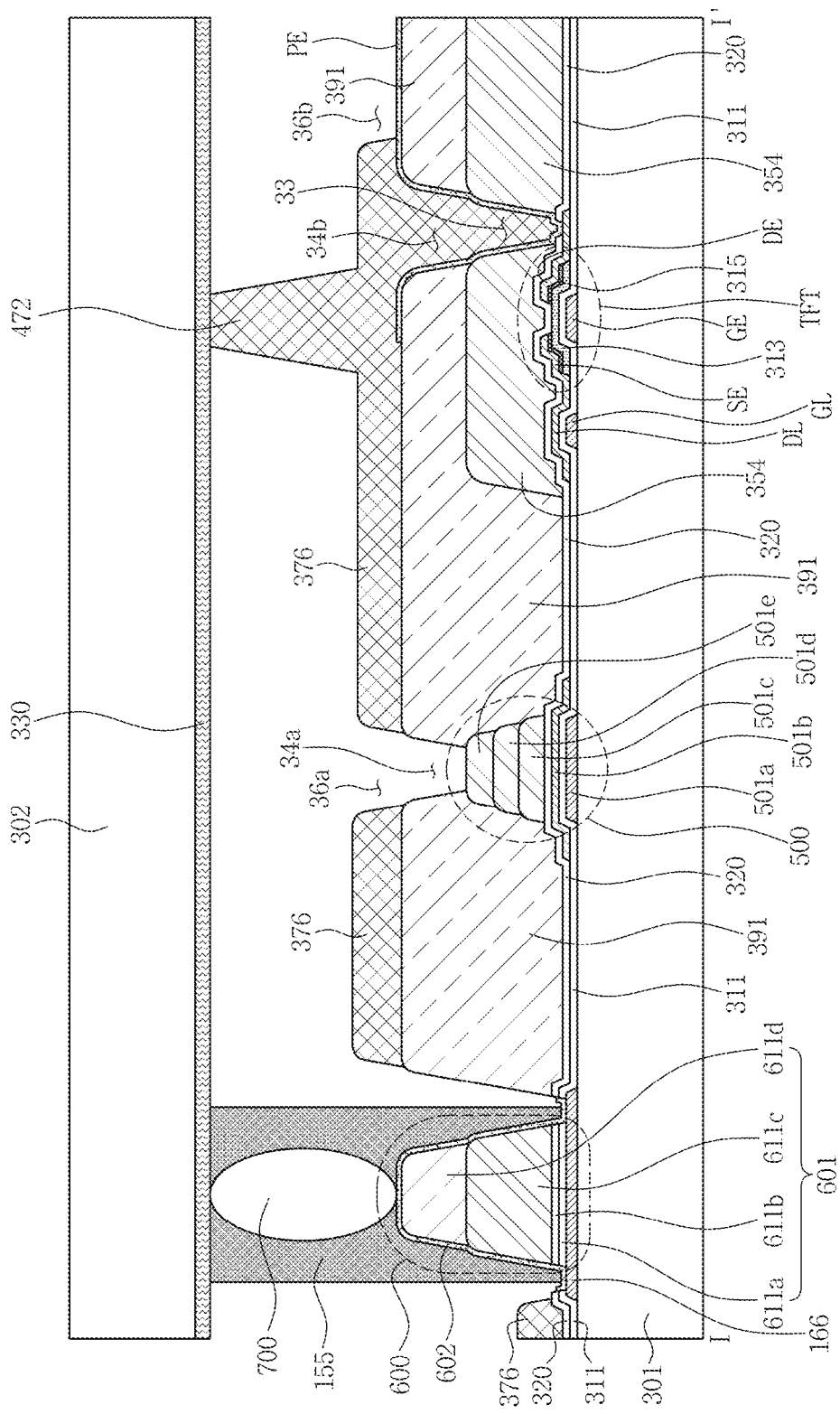
FIG. 8 is another cross-sectional view taken along line I-I' of FIG. 5.

FIG. 8 is another cross-sectional view taken along line I-I' of FIG. 5.

An aperture covering portion 500, as illustrated in FIG. 8, may include vertically stacked first, second, third, fourth, and fifth covering patterns 501a, 501b, 501c, 501d, and 501e. In an exemplary embodiment, the third, fourth, and fifth covering patterns 501c, 501d, and 501e include color filter materials having different colors. In an exemplary embodiment, the third covering pattern 501c may include the same material as that included in a red color filer, for example. The fourth covering pattern 501d may include the same material as that included in a green color filer, for example. The fifth covering pattern 501e may include the same material as that included in a blue color filer, for example. In this case, the light shielding effect of the aperture covering portion 500 may further be enhanced.

A stacked structure including the third, fourth, and fifth covering patterns 501c, 501d, and 501e may have the same thickness as that of one of color filters 354. To this end, the third, fourth, and fifth covering patterns 501c, 501d, and 501e and the color filter 354 may be provided in a diffraction exposure scheme. In an exemplary embodiment, the third covering pattern 501c may be provided to have a thickness less than that of a red color filter due to diffraction exposure, the fourth covering pattern 501d may be provided to have a thickness less than that of a green color filter due to diffraction exposure, and the fifth covering pattern 501e may be provided to have a thickness less than that of a blue color filter due to diffraction exposure, for example.

In another exemplary embodiment, the stacked structure including the third, fourth, and fifth covering patterns 501c, 501d, and 501e may have a thickness greater than that of one of the color filters 354.

The first and second covering patterns 501a and 501b of FIG. 8 are the same as the first and second covering patterns 501a and 501b of FIG. 6.

Although not illustrated, in another exemplary embodiment, the aperture covering portion 500 may include two of the third, fourth, and fifth covering patterns 501c, 501d, and 501e.

As set forth above, according to one or more exemplary embodiments, the alignment solution may not permeate into the sealing portion forming area, due to being obstructed by the first aperture. Accordingly, the contamination of the sealing portion forming area may be prevented.

In addition, the aperture covering portion is positioned in the first aperture. Accordingly, light leakage from the first aperture may be prevented.

From the foregoing, it will be appreciated that various exemplary embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other exemplary embodiments can be mixed and matched in any manner, to produce further embodiments consistent with the invention.

What is claimed is:
1. A liquid crystal display device comprising:
a first substrate and a second substrate each including a display area and a non-display area;
a liquid crystal layer between the first substrate and the second substrate;
a sealing portion in the non-display area; and a light shielding portion having a first aperture between the display area and the sealing portion, the first aperture being spaced apart from the sealing portion;

wherein the first aperture has a closed curved line shape surrounding the display area.

2. The liquid crystal display device of claim 1, further comprising an aperture covering portion disposed corresponding to the first aperture.

3. The liquid crystal display device of claim 2, wherein the aperture covering portion has a closed curved line shape surrounding the display area.

4. The liquid crystal display device of claim 2, wherein the aperture covering portion comprises a plurality of covering patterns positioned in different layers, respectively.

5. The liquid crystal display device of claim 4, wherein at least two of the plurality of covering patterns include different materials.

6. The liquid crystal display device of claim 5, wherein the plurality of covering patterns include first, second and third covering patterns, and the first covering pattern includes a same material as that included in a gate line of the first substrate.

7. The liquid crystal display device of claim 6, wherein the first covering pattern and the gate line are disposed on a same layer.

8. The liquid crystal display device of claim 6, wherein the second covering pattern includes a same material as that included in a data line of the first substrate.

9. The liquid crystal display device of claim 8, wherein the second covering pattern and the data line are disposed on a same layer.

10. The liquid crystal display device of claim 8, wherein the third covering pattern includes a same material as that included in a color filter on one of the first and second substrates.

11. The liquid crystal display device of claim 10, wherein the third covering pattern and the color filter are disposed on a same layer.

12. The liquid crystal display device of claim 10, wherein the color filter comprises color filters having different colors, and the third covering pattern includes a same material as that included in one of the color filters having different colors which has a lowest light transmittance.

13. The liquid crystal display device of claim 10, wherein the color filter comprises color filters having different colors, and the third covering pattern includes a same material as that included in one of the color filters having different colors which has a greatest thickness.

14. The liquid crystal display device of claim 10, wherein the color filter comprises color filters having different colors, and the third covering pattern comprises at least two covering patterns including a same material as that included in at least two color filters.

15. The liquid crystal display device of claim 14, wherein the at least two covering patterns have a same thickness as that of one of the color filters.

16. The liquid crystal display device of claim 1, wherein the light shielding portion further has a second aperture in the display area.

17. The liquid crystal display device of claim 1, further comprising a common line between the first substrate and the sealing portion.

18. The liquid crystal display device of claim 17, further comprising a short-circuit portion connecting the common line and a common electrode of the second substrate.

19. The liquid crystal display device of claim 1, wherein a portion of the light shielding portion is disposed between the sealing portion and the first aperture.

20. A liquid crystal display device comprising:
a first substrate and a second substrate each including a display area and a non-display area;
a liquid crystal layer between the first substrate and the second substrate;
a sealing portion in the non-display area;
a light shielding portion having a first aperture between the display area and the sealing portion; and
an insulating interlayer between the light shielding portion and the first substrate, the insulating interlayer having an aperture corresponding to the first aperture.

* * * * *